(12) United States Patent
Wang et al.

(10) Patent No.: US 12,377,901 B2
(45) Date of Patent: Aug. 5, 2025

(54) CONTROL SYSTEM, CARRIER, AND CONTROL METHOD

(71) Applicant: Wonderland Switzerland AG, Steinhausen (CH)

(72) Inventors: Tao Wang, Steinhausen (CH); Manqun Cheng, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 469 days.

(21) Appl. No.: 17/901,854

(22) Filed: Sep. 2, 2022

(65) Prior Publication Data

US 2023/0062990 A1 Mar. 2, 2023

(30) Foreign Application Priority Data

Sep. 2, 2021 (CN) .......................... 202111026100.8

(51) Int. Cl.
*B62B 9/14* (2006.01)
*B62B 9/00* (2006.01)
*E04H 15/02* (2006.01)

(52) U.S. Cl.
CPC .............. *B62B 9/14* (2013.01); *B62B 9/005* (2013.01); *E04H 15/02* (2013.01); *A45B 2200/1009* (2013.01)

(58) Field of Classification Search
None
See application file for complete search history.

(56) References Cited

U.S. PATENT DOCUMENTS

| 2007/0240831 | A1* | 10/2007 | Tran | B60P 3/343 |
| | | | | 160/67 |
| 2013/0162396 | A1* | 6/2013 | Yang | B60L 15/20 |
| | | | | 701/22 |
| 2019/0301166 | A1* | 10/2019 | Thompson | E04F 10/0651 |
| 2024/0041171 | A1* | 2/2024 | Davila | H04R 1/025 |

FOREIGN PATENT DOCUMENTS

| CN | 204309855 U | | 5/2015 | |
| CN | 106882253 A | * | 6/2017 | |
| CN | 206552095 U | | 10/2017 | |
| CN | 107323512 B | | 5/2019 | |
| CN | 110077448 A | * | 8/2019 | ......... B62B 9/14 |
| KR | 20180065088 A | * | 6/2018 | |
| TW | 200521008 | | 7/2005 | |
| WO | 2019/126570 A1 | | 6/2019 | |

* cited by examiner

*Primary Examiner* — David R Dunn
*Assistant Examiner* — Danielle Jackson
(74) *Attorney, Agent, or Firm* — Winston Hsu

(57) ABSTRACT

Disclosed is a control system suitable for controlling a ceiling structure of a carrier. The control system includes: a processing module; a sensor module, electrically coupled to the processing module and senses an external wind-force; and a driving device, electrically coupled to the processing module and controls unfolding and folding of the ceiling structure, wherein when the processing module determines through the sensor module that the external wind-force is greater than a predetermined wind-force threshold, the driving device is controlled such that the ceiling structure shelters at least part of the carrier. Also disclosed is a carrier including a ceiling structure, and a control method suitable for controlling a ceiling structure of a carrier.

18 Claims, 11 Drawing Sheets

CONTROL SYSTEM, CARRIER, AND CONTROL METHOD

BACKGROUND OF THE INVENTION

1. Field of the Invention

The present disclosure relates to a control system suitable for controlling a ceiling structure of a carrier, a carrier including a ceiling structure, and a control method suitable for controlling the ceiling structure of the carrier.

2. Description of the Prior Art

A child stroller is a common device that can carry a child and can be pushed around by the child's guardian.

A child stroller usually has a stroller frame, a walking mechanism, and a seat or sleeping basket. Among them, the stroller frame is used to assemble other parts of the child stroller; the walking mechanism provides a walking function of the child stroller, and is usually implemented as wheels installed under the stroller frame; and the seat or sleeping basket is used to carry child, and is usually installed in a middle of the stroller frame.

A child stroller usually has a ceiling that is installed over the seat to provide a shelter for child. The ceiling can be arranged in a form that can be unfolded and folded. When the ceiling is unfolded, the ceiling provides a cover over the seat, and forms a substantially closed space together with the seat, which provides good protection for child. When the ceiling is folded, it no longer shelters the space above the seat, so as to facilitate the guardian to put child in or out of the seat.

For a transportation equipment such as a child stroller commonly used in children's traveling, although its canopy structure can be spread or retracted to protect child from the sun and the wind, due to difference in wind perception between an adult and a child, the caregiver may not be able to unfold the canopy in time for the child in car, such that the child may suffer wind damage.

SUMMARY OF THE INVENTION

A control system according to the present disclosure is suitable for controlling a ceiling structure of a carrier. The control system includes: a processing module; a sensor module, electrically coupled to the processing module and configured to detect an external wind-force; and a driving device, electrically coupled to the processing module and configured to drive the unfolding and folding of the ceiling structure, wherein the processing module controls the driving device to drive the ceiling structure to shelter at least part of the carrier in response to a determination that the external wind-force is greater than a predetermined wind-force threshold.

The present disclosure further discloses a carrier, comprising: a ceiling structure, having an unfolded position and a folded position; and the control system of claim 1, configured to control the ceiling structure to be in the unfolded position or the folded position according to the external wind-force.

A control method according to the present disclosure is suitable for controlling a ceiling structure of a carrier. The control method includes: sensing an external wind-force by a wind-force sensor; driving a first ceiling rod of the ceiling structure toward an unfolded position in response to that the external wind-force is greater than a predetermined wind-force threshold; and driving the first ceiling rod toward a folded position in response to that the external wind-force is less than the predetermined wind-force threshold.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Embodiments of the present disclosure will be specifically described below in conjunction with the accompanying drawings, in which.

DETAILED DESCRIPTION

While the invention is illustrated and described herein with reference to specific embodiments, the invention should not be limited to the details shown. Specifically, various modifications may be made in these details within the scope of equivalents of the appended claims and without departing from the invention.

The descriptions of directions such as "front," "rear," "upper," and "lower" involved in the present disclosure are only for the convenience of understanding. The invention is not limited to these directions, rather, but can be adjusted according to the actual situation. Moreover, although the present disclosure is described with reference to several exemplary embodiments, the terms used are terms of description and illustration rather than limitation.

Figure 1:
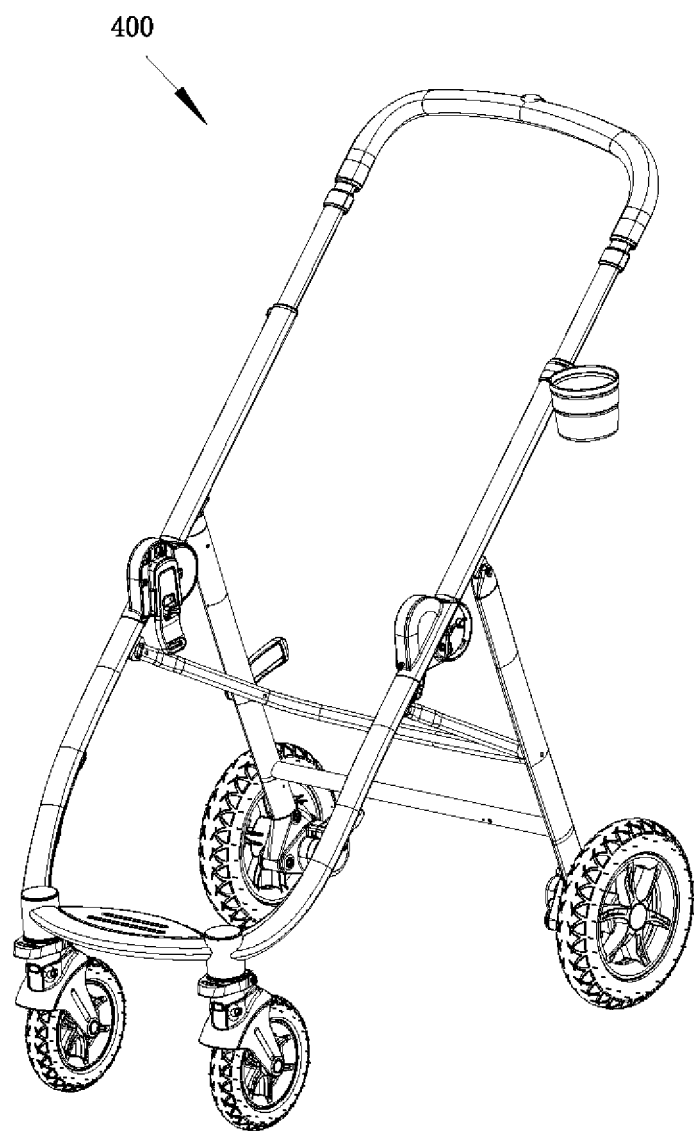
FIG. 1 is a schematic view of a child stroller according to the prior art, showing a stroller frame and wheels.
Figure 2:
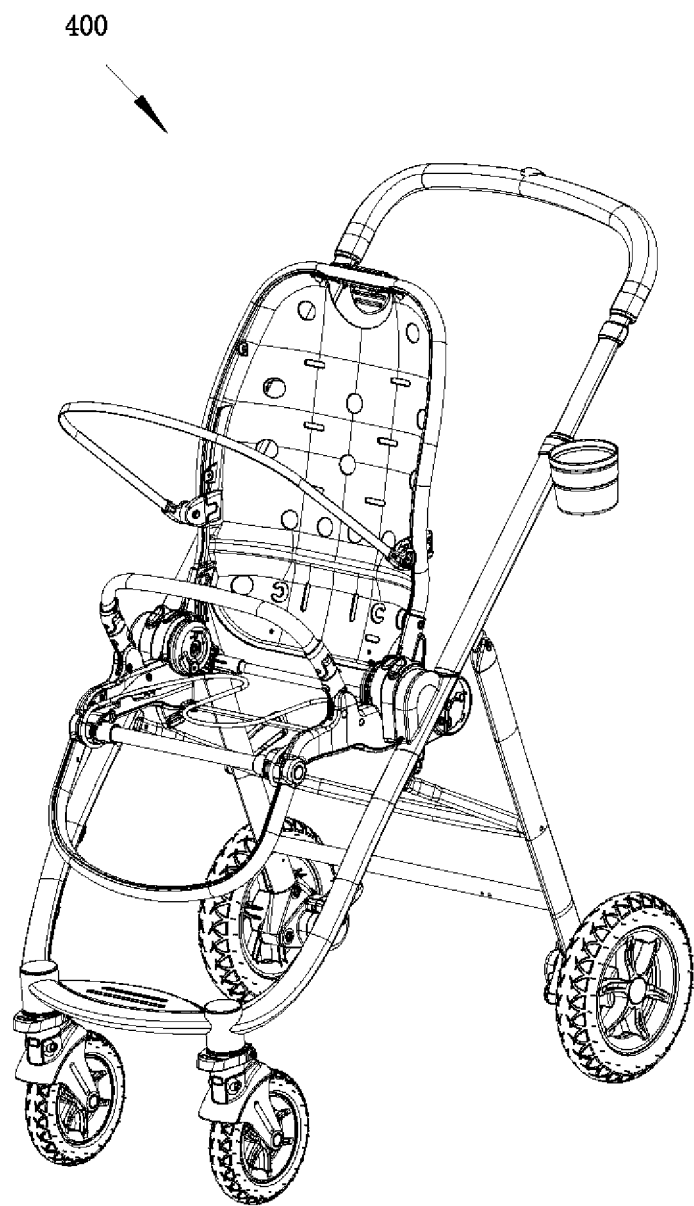
FIG. 2 is a schematic view of the child stroller according to the prior art, showing the stroller frame, a seat, and the wheels.

Now a child stroller 400 of the prior art will be described with reference to FIGS. 1 to 2. As shown, the child stroller includes a stroller frame and a seat. The stroller frame is used to carry other components of the child stroller, and the seat is installed on the stroller frame for child to sit. A walking device such as one or more wheels is installed under the stroller frame, and a handrail is installed above the stroller frame for facilitating a guardian to push the child stroller.

Figure 3:
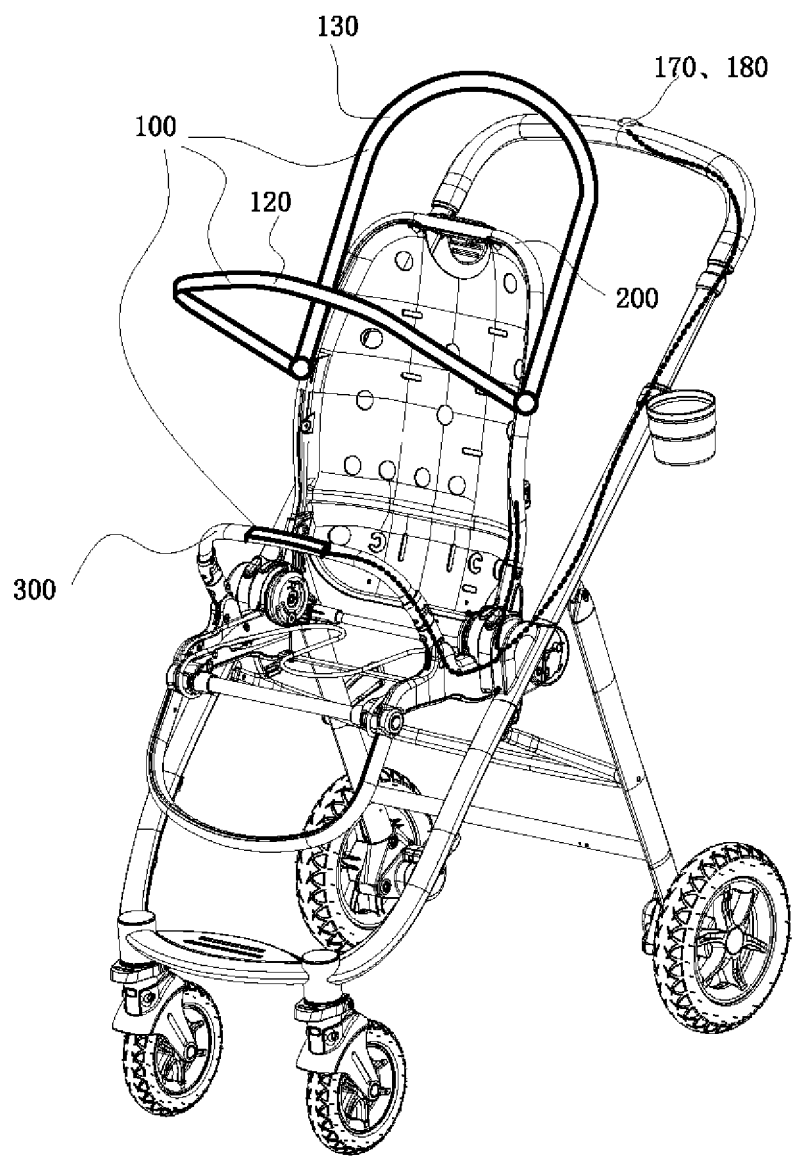
FIG. 3 is a schematic view of a child stroller according to the present disclosure, showing a first ceiling rod and a second ceiling rod, wherein the first ceiling rod is in an unfolded position.
Figure 4:
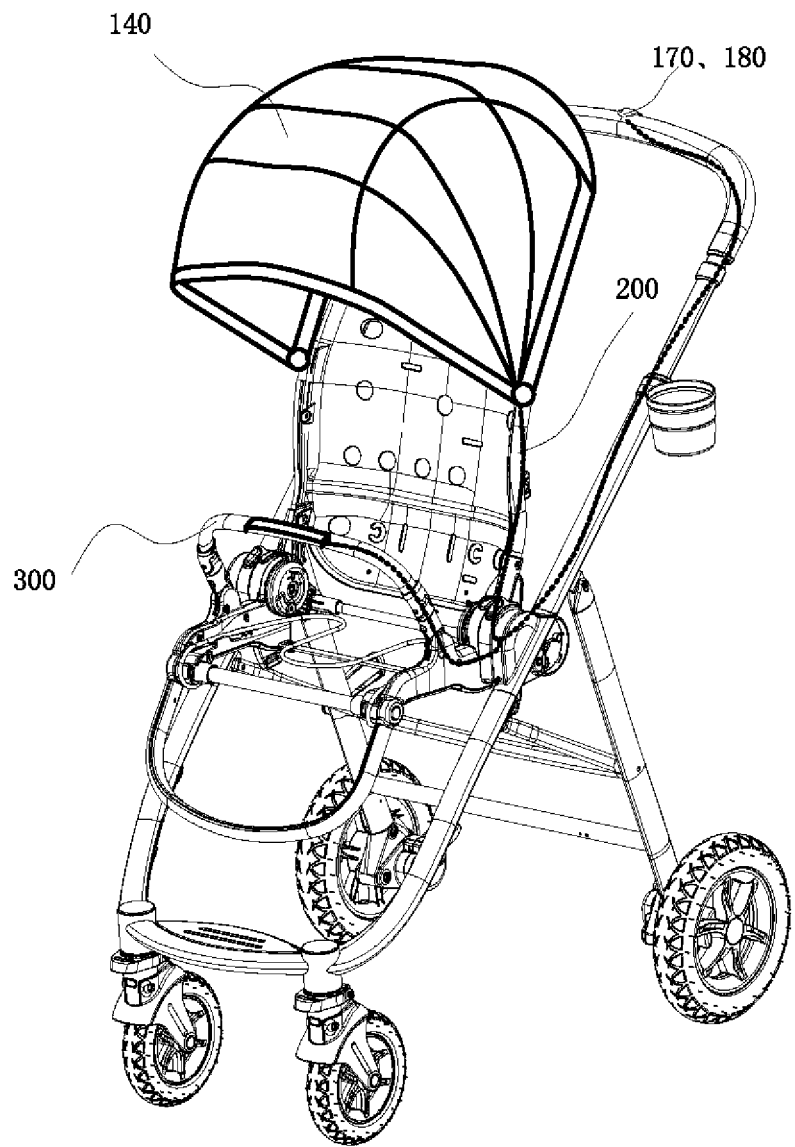
FIG. 4 is a schematic view of the child stroller according to the present disclosure, showing the first ceiling rod, the second ceiling rod, and a cover, wherein the first ceiling rod is in an unfolded position.
Figure 5:
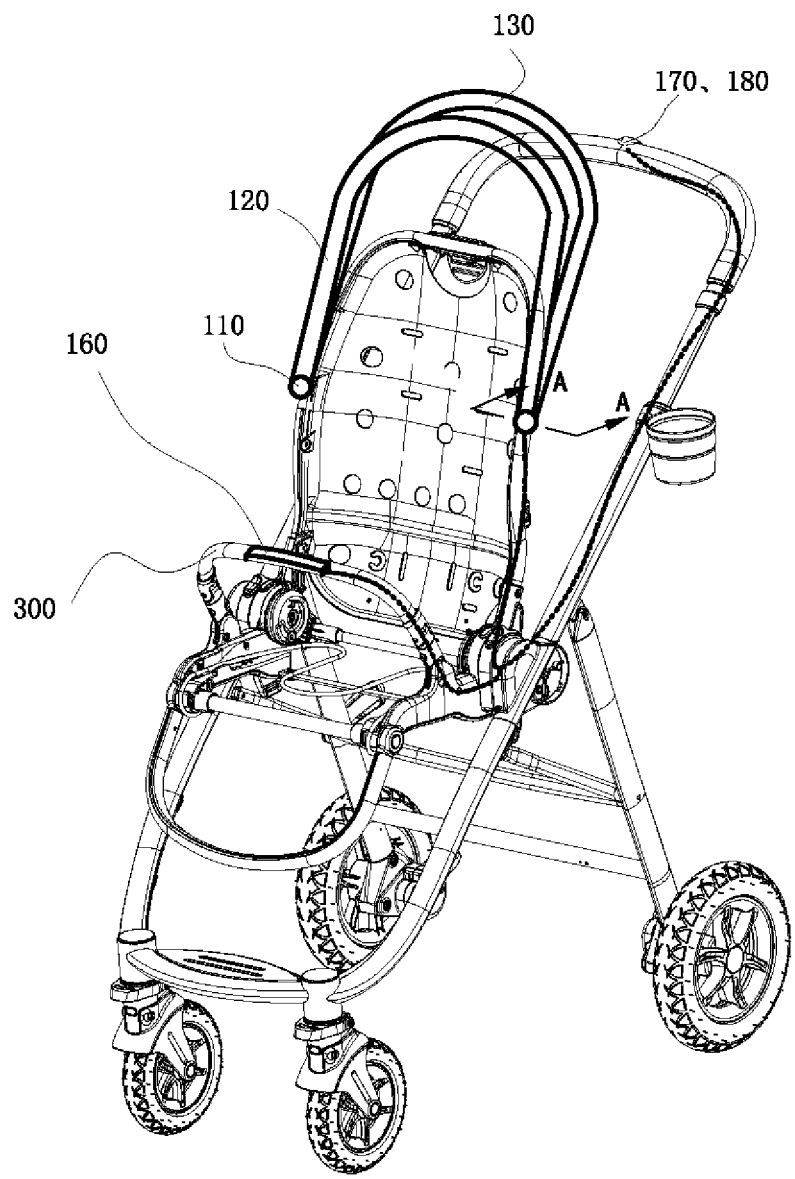
FIG. 5 is a schematic view of the child stroller according to the present disclosure, showing the first ceiling rod and the second ceiling rod wherein the first ceiling rod is in a folded position.

Now the child stroller having the ceiling structure 100 according to the present disclosure will be described in its entirety with reference to FIGS. 3 to 5.

As shown, the ceiling structure 100 includes: an axle housing 110, a first ceiling rod 120, a second ceiling rod 130, and a cover 140. The axle housing 110 is symmetrically installed on both sides of the seat 200 for connecting the seat 200 to the ceiling structure 100 and accommodating part of the ceiling structure 100. The axle housing 110 may be an entire integral component that transversely penetrates the seat 200, or may be two independent components that are separately installed on both sides of the seat 200. When the axle housing 110 is an integral component, its own extension direction defines a transverse pivoting axis of the ceiling structure 100; and when the axle housing 110 is two independent components, a connecting line between the two components defines the transverse pivoting axis of the ceiling structure 100.

Both the first ceiling rod 120 and the second ceiling rod 130 are U-shaped, wherein a middle section of the U-shape is upward for supporting the cover 140. Both ends of the second ceiling rod 130 are respectively connected to the axle housing 110 on both sides of the seat 200. Both ends of the first ceiling rod 120 are pivotably connected to the axle housing 110 respectively via a transmission shaft 151 (FIGS. 6A-6B), such that the first ceiling rod 120 can rotate in respect to the second ceiling rod 130 around the transverse pivoting axis. Specifically, the first ceiling rod 120 rotates between an unfolded position (FIG. 3) away from the second ceiling rod 130 and a folded position (FIG. 5) close to the second ceiling rod 130.

In an embodiment, the second ceiling rod 130 extends substantially vertically upward, and the first ceiling rod 120 extends substantially vertically upward in the folded position, that is, substantially overlaps the second ceiling rod 130. The first ceiling rod 120 extends substantially horizontally forward in the unfolded position, i.e., close to a front guard bar 300 of the seat 200. In this way, in the folded position, the second ceiling rod 130 and the first ceiling rod 120 are substantially coincident above the seat 200, such that an entire upper portion of the seat 200 is substantially open. When the first ceiling rod 120 is in the unfolded position, the cover 140 is spread into a substantially 90-degree arc-shaped cover, which shelters the entire upper space of the seat 200.

In an embodiment, there may also be a plurality of auxiliary ceiling rods between the second ceiling rod 130 and the first ceiling rod 120. When the first ceiling rod 120 is in the unfolded position, these auxiliary ceiling rods are distributed between the second ceiling rod 130 and the first ceiling rod 120, so as to provide support at different positions of the ceiling.

The ceiling structure 100 further includes a driving device 150, a transmission shaft 151 (FIGS. 6A-6B), and a sensor module 160 for controlling the ceiling structure 100. The driving device 150 is installed in the axle housing 110, and drives the first ceiling rod 120 through the transmission shaft 151. The sensor module 160 is installed on the child stroller, for example, on the front guard bar 300 of the seat 200, and is electrically coupled to the driving device 150 by wire or wirelessly, and sends a control signal to the driving device 150. The sensor module 160 may include a wind-force sensor and a light sensor, functions of which will be described in detail below.

An automatic control switch 170 and a manual control switch 180 are installed on the stroller frame, for example, on the handrail, so as to facilitate the user to operate the ceiling structure 100. This will be described in detail later.

Figure 9:
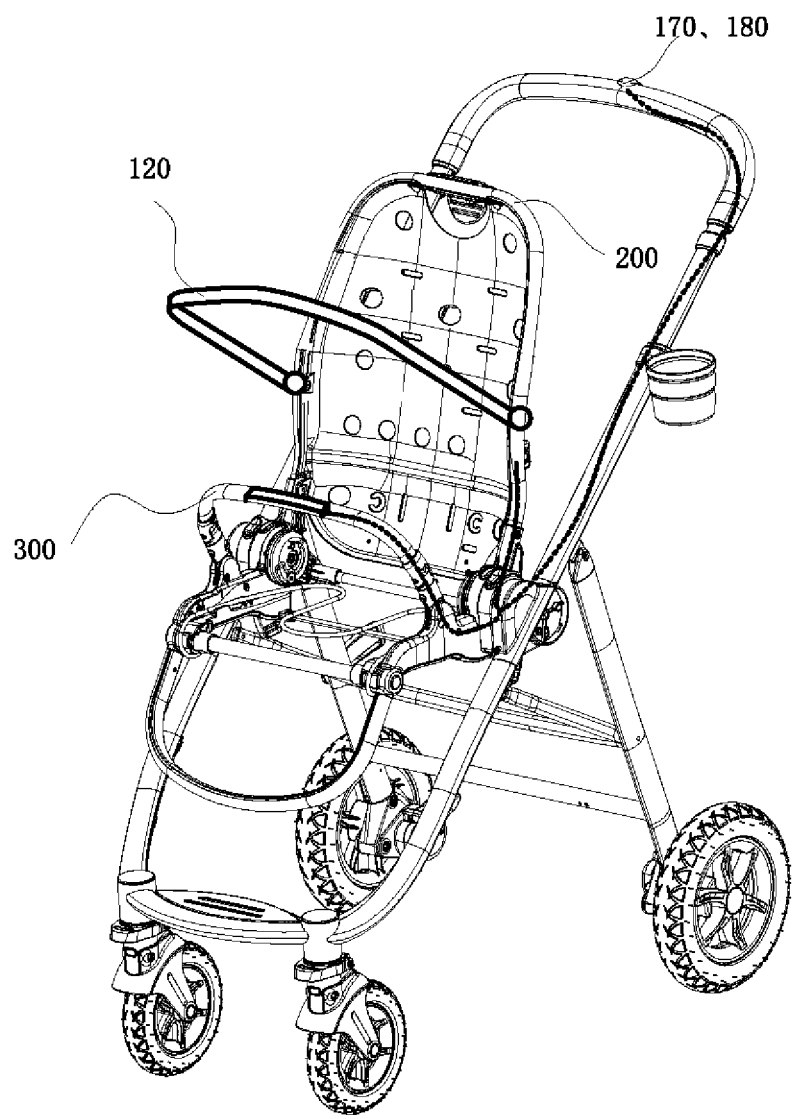
FIG. 9 is a schematic view of a ceiling structure according to another embodiment of the present disclosure, wherein the cover installed between the ceiling rod and a carrier is not shown.
Figure 10:
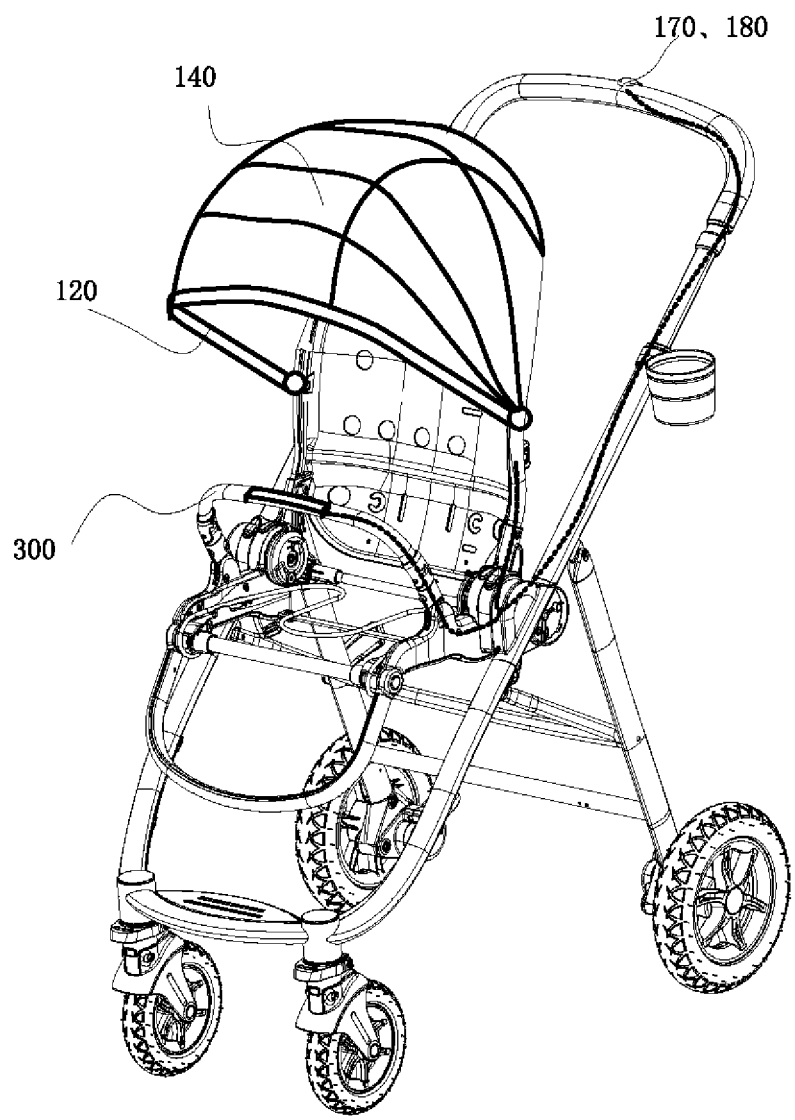
FIG. 10 shows the ceiling structure of FIG. 9, and shows the cover installed between the ceiling rod and the carrier.

Now referring to FIGS. 9 to 10, the ceiling structure according to another embodiment of the present disclosure is shown therein.

In this embodiment, the ceiling structure does not have the second ceiling rod 130. The cover 140 is directly installed between the first ceiling rod 120 and the seat 200. More specifically, one end of the cover 140 is connected to the first ceiling rod 120 and the other end is connected to the seat 200, and the position where the cover 140 is connected to the seat is substantially corresponding to the position where the first ceiling rod 120 is when the first ceiling rod 120 is rotated to be close to the seat 200.

In this way, the ceiling structure 100 can omit the second ceiling rod 130, thereby reducing an overall weight of the carrier.

An internal structure of the axle housing 110 according to the present disclosure will now be described with reference to FIGS. 6A-6B.

As shown, the axle housing 110 extends along a transverse pivot. In an embodiment, the driving device 150 is an electric motor transversely arranged in the axle housing 110. The transmission shaft 151 is set up on the axle housing 110 along the transverse pivot, and is connected to an electric motor as the driving device 150 via a transmission mechanism. One end of the transmission shaft 151 is connected to the driving device 150, and the other end is fixedly connected to the first ceiling rod 120, so as to transmit a driving force of the driving device 150 to the first ceiling rod 120. In this embodiment, the transmission mechanism between the driving device 150 and the transmission shaft 151 is a gear. In other embodiments, the driving device 150 may be a hydraulic cylinder or another suitable form, and the transmission mechanism may be a belt, worm-and-wheel, or another suitable form. A processing module 190 is disposed in the axle housing 110 and is electrically coupled to the sensor module 160, the driving device 150, the position detecting device 155, the automatic control switch 170, and the manual control switch 180. The processing module 190 is, for example, a microprocessor, microcontroller, digital signal processor, microcomputer, central processing module, FPGA, programmable logic device, logic circuit, analog circuit, digital circuit, and/or other circuit-based and/or devices such as hardware-encoded signals (analog and/or digital) that can execute instructions.

Figure 6A:
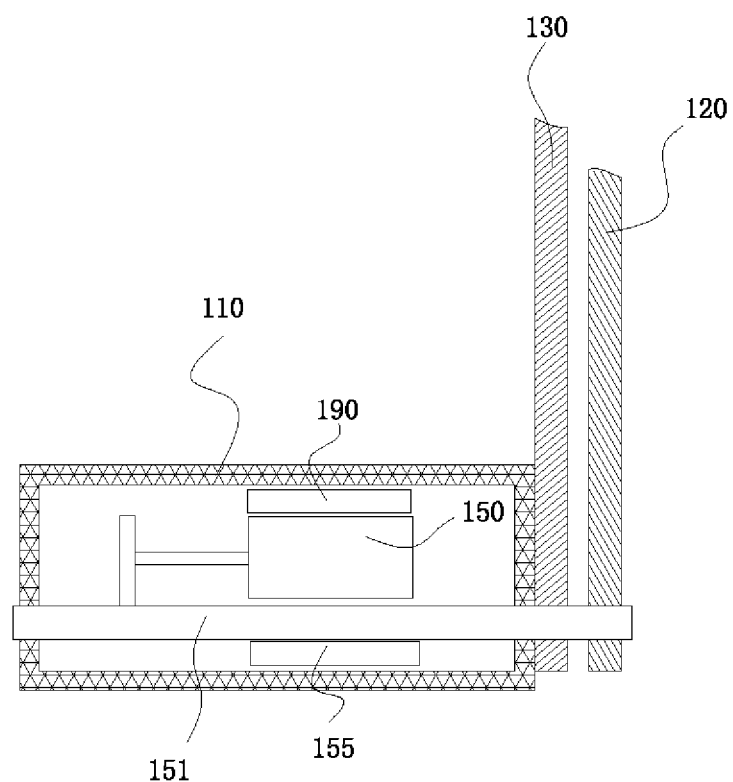
FIGS. 6A to 6B are respectively enlarged partial sectional views taken along a line A-A in FIG. 5, principally showing an internal structure of an axle housing.

In the embodiment shown in FIG. 6A, the second ceiling rod 130 and the first ceiling rod 120 are attached to an outer side of the axle housing 110. The second ceiling rod 130 is closer to an end of the axle housing 110, and the first ceiling rod 120 is stacked on an outer side of the second ceiling rod 130. The transmission shaft 151 extends from the axle housing 110, and is connected to the first ceiling rod 120 by passing through the second ceiling rod 130. In this way, driving force of the driving device 150 is transmitted to the first ceiling rod 120 through the transmission shaft 151.

Figure 6B:
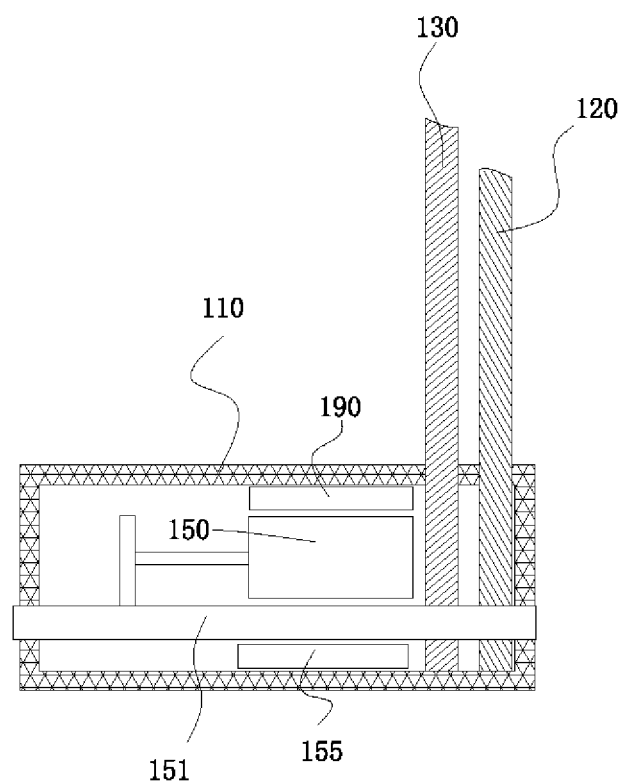

In the embodiment shown in FIG. 6B, the second ceiling rod 130 and the first ceiling rod 120 are attached to an inner side of the axle housing 110. Among them, the second ceiling rod 130 is closer to an end of the axle housing 110, and the first ceiling rod 120 is stacked on the outer side of the second ceiling rod 130. The second ceiling rod 130 and the first ceiling rod 120 respectively protrude from grooves provided on a circumferential side wall of the axle housing 110. The transmission shaft 151 may be connected to the first ceiling rod 120 inside the axle housing 110. In this way, driving force of the driving device 150 is transmitted to the first ceiling rod 120 through the transmission shaft 151.

In an embodiment, the axle housing 110 is provided with a position detecting device 155, which can detect the position of the first ceiling rod 120, and brake the driving device 150 when the first ceiling rod 120 moves to a predetermined position (i.e., the unfolded position or the folded position). The position detecting device 155 may be a grating or poke rod, which can be triggered to send out a corresponding signal when the first ceiling rod 120 moves to the predetermined position.

Figure 7:
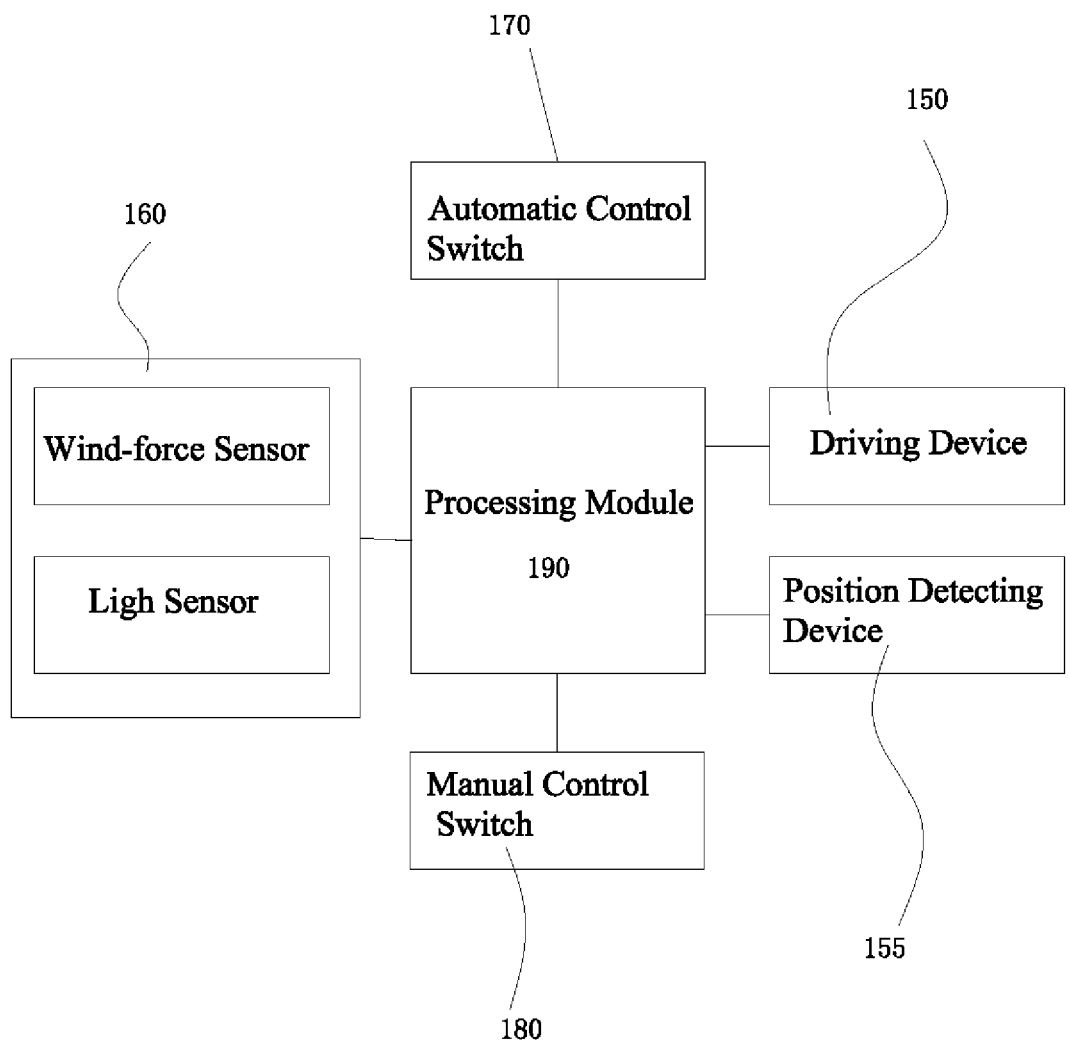
FIG. 7 is a schematic view of electrical connections among components of the ceiling structure according to the present disclosure.

Now a circuit connection of the control system of the ceiling structure 100 of the present disclosure will be described with reference to FIG. 7. The control system includes a processing module 190, a sensor module 160, a driving device 150, an automatic control switch 170, a manual control switch 180, and a position detecting device 155.

As shown, the wind-force sensor and the light sensor in the sensor module 160 are electrically coupled to the processing module 190, so as to transmit the detected wind and light intensities to the processing module 190. The automatic control switch 170 and the manual control switch 180 are electrically coupled to the processing module 190 for determining whether the processing module 190 sends a control signal to the driving device 150 to automatically control movement of the first ceiling rod 120. The position detecting device 155 is electrically coupled to the processing module 190, so as to send the position of the first ceiling rod 120 to the processing module 190. The driving device 150 is electrically coupled to the processing module 190, so as to receive a control signal from the processing module 190 and drive the first ceiling rod 120 in response to the control signal. When the automatic control switch 170 is activated, the driving device 150 performs driving in response to the control signal sent by the processing module 190 according to the sensing signal sensed by the sensor module 160, that is, the driving device 150 drives the ceiling structure 100 in response to the sensing signal sensed by the sensor module 160. When the manual control switch 180 is activated, the driving device 150 does not perform driving in response to the control signal sent by the processing module 190 according to the sensing signal sensed by the sensor module 160, that is, the driving device 150 no longer performs driving in response to the control signal sent by the processing module 190.

Figure 8:
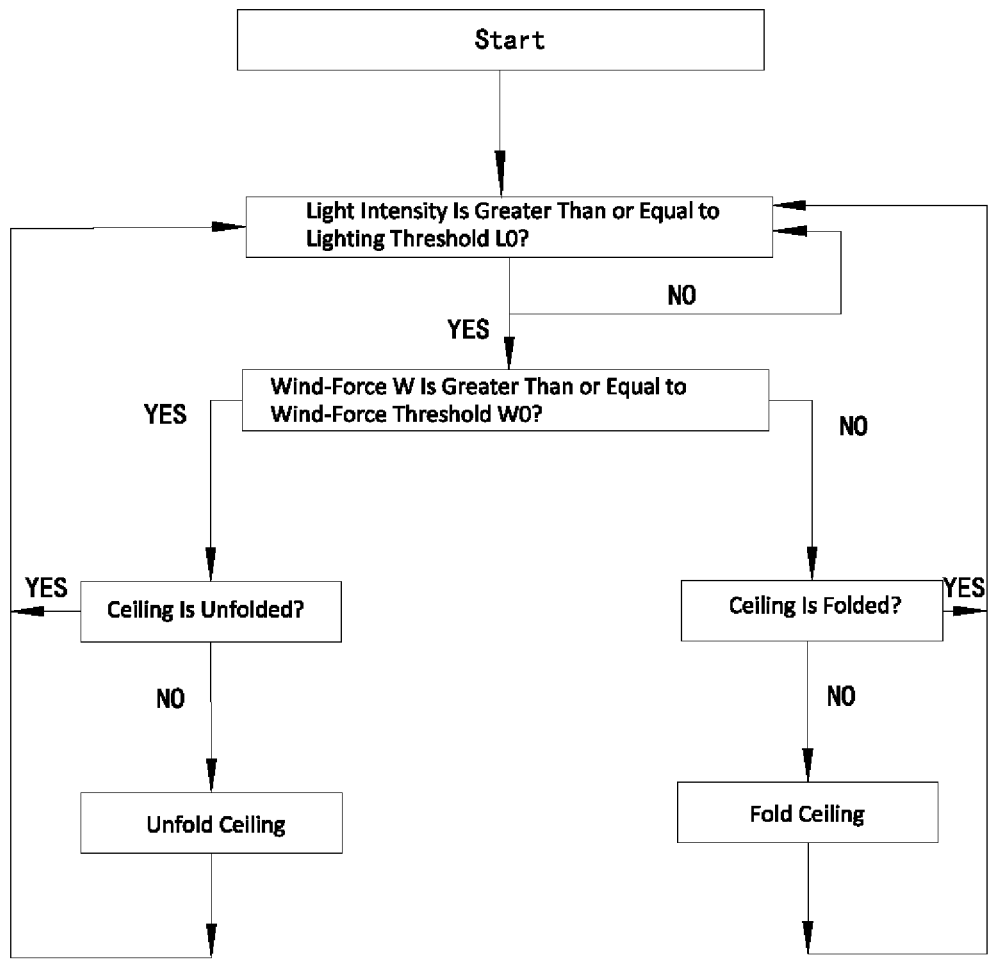
FIG. 8 is a flowchart of a control method for the ceiling structure according to the present disclosure.

Now a control method of the ceiling structure 100 according to the present disclosure will be described with reference to FIG. 8.

Firstly, a wind-force threshold W0 is predetermined, and the wind-force value may be predetermined and stored in the processing module 190, or may be set by the user. Under the circumstance that the automatic control switch 170 is turned on, the external wind-force W is detected by the wind-force sensor. When W≥W0, the ceiling is automatically unfolded by the driving device 150 controlled by the processing module 190. Specifically, if the first ceiling rod 120 is in the folded position, the first ceiling rod 120 is driven toward the unfolded position by the driving device 150; if the first ceiling rod 120 is in the unfolded position, the first ceiling rod 120 is no longer moved by the driving device 150, and the method returns to the step of detecting the external wind-force W. When W<W0, the ceiling is automatically folded. Specifically, if the first ceiling rod 120 is in the unfolded position by the driving device 150 controlled by the processing module 190, the first ceiling rod 120 is driven toward the folded position by the driving device 150 and if the first ceiling rod 120 is in the folded position, then the first ceiling rod 120 is no longer moved by the driving device 150.

In an embodiment, the wind-force threshold W0 may be set in a range of 6.8 Pa-39.0 Pa, but the present disclosure is not limited to this range.

In an embodiment, the ceiling will not be unfolded instantly upon detection of the wind-force W exceeding the wind-force threshold W0, so as to avoid the ceiling structure being overly sensitive. Only after the wind-force sensor detects that the wind pressure exceeds the predetermined wind-force threshold W0 for a plurality of times within duration T0, the ceiling will be unfolded by the driving device 150 controlled by the processing module 190. For example, the duration T0 may be set in a range of 0-3 minutes, and the wind-force W is detected multiple times within the duration T0 to calculate an average value. When the average value is greater than or equal to the predetermined wind-force threshold W0, the ceiling is unfolded; and when the average value is less than the predetermined wind-force threshold W0, then the ceiling is folded by the driving device 150 controlled by the processing module 190.

In an embodiment, the ceiling structure 100 may also be controlled according to a light sensor. Specifically, a predetermined lighting threshold L0 is predetermined. An external light intensity L may be detected by the light sensor. If L<L0, it means that the child stroller is, e.g., in an indoor environment, so the operation of the driving device 150 is prevented by the processing module 190, i.e., the driving device 150 is prevented from performing driving in response to the wind-force sensor, so as to save power consumption.

According to an aspect of the present disclosure, a control system suitable for controlling a ceiling structure of a carrier, wherein the control system comprises: a processing module; a sensor module, electrically coupled to the processing module and configured to detect an external wind-force; and a driving device, electrically coupled to the processing module and configured to drive the unfolding and folding of the ceiling structure, wherein the processing module controls the driving device to drive the ceiling structure to shelter at least part of the carrier in response to a determination that the external wind-force is greater than a predetermined wind-force threshold.

In an aspect, the sensor module includes a wind-force sensor configured to sense the external wind-force.

In an aspect, the sensor module further includes a light sensor configured to sense an external light intensity, wherein the processing module stops operation of the driving device in response to a determination that the sensed light intensity is less than a predetermined lighting threshold.

In an aspect, the control system further comprises an automatic control switch and a manual control switch, and the automatic control switch and the manual control switch are electrically coupled to the processing module; wherein when the automatic control switch is activated, the driving device drives the ceiling structure in response to a sensing signal sensed by the sensor module; and when the manual control switch is activated, the driving device does not drive the ceiling structure in response to the sensing signal sensed by the sensor module.

In an aspect, the control system further comprises a position detecting device, the position detecting device is electrically coupled to the processing module and is configured to sense a position of a first ceiling rod of the ceiling structure, wherein the driving device stop driving the ceiling structure in response to a determination that the first ceiling rod moves to a predetermined position.

In another aspect of the present disclosure, a carrier, comprising: a ceiling structure, having an unfolded position and a folded position; and the control system of claim 1, configured to control the ceiling structure to be in the unfolded position or the folded position according to the external wind-force.

In an aspect, the ceiling structure comprises: an axle housing, symmetrically installed on both transverse sides of the carrier; a transmission shaft, set up on the axle housing and defining a transverse pivoting axis; a first ceiling rod, being U-shaped, and having two ends pivotably connected to the axle housing respectively via the transmission shaft, such that the first ceiling rod is able to rotate around the transverse pivoting axis between an unfolded position and a folded position; a cover, installed between the carrier and the first ceiling rod, and being unfolded and folded as the first ceiling rod rotates; a driving device, disposed in the axle housing, and being able to drive the transmission shaft to rotate; a sensor module, disposed on the carrier, and electrically coupled to the driving device and sending a sensing signal to the processing module; and the sensor module includes a wind-force sensor capable of sensing an external wind-force, and when the external wind-force is greater than a predetermined wind-force threshold, the processing module controls the driving device to drive the first ceiling rod to the unfolded position.

In an aspect, the ceiling structure further includes a second ceiling rod, the second ceiling rod is U-shaped, and its two ends are respectively fixedly connected to the axle housing; and the cover is connected to the carrier by attaching to the second ceiling rod.

In an aspect, the second ceiling rod extends substantially vertically upward, the first ceiling rod extends substantially vertically upward in the folded position, and extends substantially horizontally forward in the unfolded position.

In an aspect, the driving device is an electric motor, and the transmission shaft is connected to the driving device via a transmission mechanism.

In an aspect, the transmission shaft is disposed in the axle housing at least partially along the transverse pivoting axis, one end of the transmission shaft is connected to the driving device, and the other end is fixedly connected to the first ceiling rod, so as to transmit a driving force of the driving device to the first ceiling rod.

In an aspect, a position detecting device is disposed in the axle housing, the position detecting device is able to send a position of the first ceiling rod to the processing module, and the processing module stops driving the driving device when the first ceiling rod moves to a predetermined position.

In an aspect, the sensor module further includes a light sensor for sensing an external light intensity, the light sensor is configured that, when the light intensity is less than a predetermined lighting threshold, the driving device is stopped by the processing module from driving the first ceiling rod in response to the signal from the sensor module.

In an aspect, the carrier further comprising: an automatic control switch, disposed on the carrier and electrically coupled to the driving device, the automatic control switch being arranged to be activated such that the driving device drives the ceiling structure in response to a sensing signal sent by the sensor module; and a manual control switch, disposed on the carrier and electrically coupled to the driving device, the manual control switch being arranged to be activated such that the driving device does not drive the ceiling structure in response to a sensing signal of the sensor module.

According to another aspect of the present disclosure a control method suitable for controlling a ceiling structure of a carrier, wherein the control method comprises: sensing an external wind-force by a wind-force sensor; driving a first ceiling rod of the ceiling structure toward an unfolded position in response to that the external wind-force is greater than a predetermined wind-force threshold; and driving the first ceiling rod toward a folded position in response to that the external wind-force is less than the predetermined wind-force threshold.

In an aspect, the control method further comprises: measuring the external wind-force multiple times within a predetermined duration, and obtaining a wind-force average value of the multiple measured wind-force values; driving the first ceiling rod toward the unfolded position in response to that the wind-force average value is greater than or equal to the predetermined wind-force threshold; and driving the first ceiling rod toward the folded position in response to that the wind-force average value is less than the predetermined wind-force threshold.

In an aspect, the control method further comprises: sensing an external light intensity; stopping driving the first ceiling rod in response to the external wind-force when the external light intensity is less than a predetermined lighting threshold.

In an aspect, the predetermined wind-force threshold is set in a range of 6.8 Pa-39.0 Pa.

In conclusion, the present disclosure provides a ceiling structure and a child stroller having the ceiling structure. The ceiling structure can automatically unfold and fold the ceiling according to the external wind and light conditions.

Since the present disclosure can be embodied in various forms without departing from the spirit and essence of the present disclosure, it should be understood, the above embodiments are not limited to any of the foregoing details, but should be interpreted in the broadest sense within the scope defined by the claims, so all changes that fall within the scope of the claims or their equivalents should be covered by the claims.

What is claimed is:

1. A control system suitable for controlling a ceiling structure of a carrier, wherein the control system comprises:
   a processing module;
   a sensor module, electrically coupled to the processing module and configured to detect an external wind-force; and
   a driving device, electrically coupled to the processing module and configured to drive unfolding and folding of the ceiling structure,
   wherein the processing module controls the driving device to drive the ceiling structure to shelter at least part of the carrier in response to a determination that the external wind-force is greater than a predetermined wind-force threshold.

2. The control system according to claim 1, wherein:
   the sensor module includes a wind-force sensor configured to sense the external wind-force.

3. The control system according to claim 2, wherein:
   the sensor module further includes a light sensor configured to sense an external light intensity, wherein the processing module stops operation of the driving device in response to a determination that the sensed light intensity is less than a predetermined lighting threshold.

4. The control system according to claim 1, wherein:
the control system further comprises an automatic control switch and a manual control switch, and the automatic control switch and the manual control switch are electrically coupled to the processing module;
wherein when the automatic control switch is activated, the driving device drives the ceiling structure in response to a sensing signal sensed by the sensor module; and when the manual control switch is activated, the driving device does not drive the ceiling structure in response to the sensing signal sensed by the sensor module.

5. The control system according to claim 1, wherein:
the control system further comprises a position detecting device, the position detecting device is electrically coupled to the processing module and is configured to sense a position of a first ceiling rod of the ceiling structure, wherein the driving device stops driving the ceiling structure in response to a determination that the first ceiling rod moves to a predetermined position.

6. A carrier, comprising:
a ceiling structure, having an unfolded position and a folded position; and
the control system of claim 1, configured to control the ceiling structure to be in the unfolded position or the folded position according to the external wind-force.

7. The carrier according to claim 6, wherein the ceiling structure comprises:
an axle housing, symmetrically installed on both transverse sides of the carrier;
a transmission shaft, set up on the axle housing and defining a transverse pivoting axis;
a first ceiling rod, being U-shaped, and having two ends pivotably connected to the axle housing respectively via the transmission shaft, such that the first ceiling rod is able to rotate around the transverse pivoting axis between an unfolded position and a folded position;
a cover, installed between the carrier and the first ceiling rod, and being unfolded and folded as the first ceiling rod rotates;
the driving device, disposed in the axle housing, and being able to drive the transmission shaft to rotate;
the sensor module, disposed on the carrier, and electrically coupled to the driving device and sending a sensing signal to the processing module; and
the sensor module includes a wind-force sensor capable of sensing an external wind-force, and when the external wind-force is greater than a predetermined wind-force threshold, the processing module controls the driving device to drive the first ceiling rod to the unfolded position.

8. The carrier according to claim 7, wherein:
the ceiling structure further includes a second ceiling rod, the second ceiling rod is U-shaped, and its two ends are respectively fixedly connected to the axle housing; and
the cover is connected to the carrier by attaching to the second ceiling rod.

9. The carrier according to claim 8, wherein:
the second ceiling rod extends substantially vertically upward, the first ceiling rod extends substantially vertically upward in the folded position, and extends substantially horizontally forward in the unfolded position.

10. The carrier according to claim 7, wherein:
the driving device is an electric motor, and the transmission shaft is connected to the driving device via a transmission mechanism.

11. The carrier according to claim 7, wherein:
the transmission shaft is disposed in the axle housing at least partially along the transverse pivoting axis, one end of the transmission shaft is connected to the driving device, and the other end is fixedly connected to the first ceiling rod, so as to transmit a driving force of the driving device to the first ceiling rod.

12. The carrier according to claim 7, wherein:
a position detecting device is disposed in the axle housing, the position detecting device is able to send a position of the first ceiling rod to the processing module, and the processing module stops driving the driving device when the first ceiling rod moves to a predetermined position.

13. The carrier according to claim 7, wherein:
the sensor module further includes a light sensor for sensing an external light intensity, the light sensor is configured that, when the light intensity is less than a predetermined lighting threshold, the driving device is stopped by the processing module from driving the first ceiling rod in response to the signal from the sensor module.

14. The carrier according to claim 7, further comprising:
an automatic control switch, disposed on the carrier and electrically coupled to the driving device, the automatic control switch being arranged to be activated such that the driving device drives the ceiling structure in response to a sensing signal sent by the sensor module; and
a manual control switch, disposed on the carrier and electrically coupled to the driving device, the manual control switch being arranged to be activated such that the driving device does not drive the ceiling structure in response to a sensing signal of the sensor module.

15. A control method suitable for controlling a ceiling structure of a carrier, wherein the control method comprises:
sensing an external wind-force by a wind-force sensor;
driving a first ceiling rod of the ceiling structure toward an unfolded position in response to that the external wind-force is greater than a predetermined wind-force threshold; and
driving the first ceiling rod toward a folded position in response to that the external wind-force is less than the predetermined wind-force threshold.

16. The control method according to claim 15, wherein the control method further comprises:
measuring the external wind-force multiple times within a predetermined duration, and obtaining a wind-force average value of the multiple measured wind-force values;
driving the first ceiling rod toward the unfolded position in response to that the wind-force average value is greater than or equal to the predetermined wind-force threshold; and
driving the first ceiling rod toward the folded position in response to that the wind-force average value is less than the predetermined wind-force threshold.

17. The control method according to claim 15, wherein the control method further comprises:
sensing an external light intensity;
stopping driving the first ceiling rod in response to the external wind-force when the external light intensity is less than a predetermined lighting threshold.

18. The control method according to claim 15, wherein the predetermined wind-force threshold is set in a range of 6.8 Pa-39.0 Pa.

* * * * *